Feb. 19, 1957 L. J. KABELL 2,782,310

FREQUENCY CONTROLLED OSCILLATOR

Filed Sept. 12, 1955

INVENTOR.
LOUIS J. KABELL
BY Oliver D. Mitchell
ATTORNEY

United States Patent Office 2,782,310

Patented Feb. 19, 1957

2,782,310

FREQUENCY CONTROLLED OSCILLATOR

Louis Jack Kabell, Palo Alto, Calif., assignor to Radio Corporation of America, a corporation of Delaware Application September 12, 1955, Serial No. 533,584

4 Claims. (Cl. 250—36)

The present invention relates to improvements in frequency control circuits for oscillators and, more particularly, to improvements in automatic frequency control circuits useful in television receiving systems for maintaining a synchronous relation between predetermined aspects of television receiver operation and periodically recurring components of received television signals.

More directly, the present invention relates to improvements in automatic frequency controlled oscillator circuits of the transistor variety suitable for use in color television receivers designed for reception of standard color television signals.

In the electronic art the demand frequently arises for a source of frequency stabilized alternating current signal whose excursions bear a predetermined phase or time relation to some reference signal. Such a signal source may comprise a phase detector circuit in combination with a reactance tube circuit which is connected in controlling relation to an oscillator. The reference signal and oscillator signal are compared in the phase detector circuit to produce a frequency control voltage which is applied to the reactance tube circuit. The electrical sense of the influence that the reactance tube circuit imposes on the oscillator is such to minimize or correct any variations in timing which tend to occur between the reference signal and the signal developed by the oscillator.

In color television receivers, means are generally provided for developing a continuous wave chromaticity demodulating signal which must bear a fixed synchronous relation to the burst component of the received color television signal. It has been the practice in many color receiver designs to provide such a signal through the use in combination of an oscillator, phase comparator circuit and reactance tube circuit operatively connected in the manner described above. The burst component of the received color television signal is separated from the signal and used as a reference signal against which the frequency of the oscillator is compared. The present invention allows the provision of a high sensitivity automatic frequency controlled oscillator system employing but a single transistor or semi-conductor amplifier device. Advantage is taken of that characteristic of a junction transistor which renders its output capacitance a function of collector-base potential. The output capacitance change of a transistor is employed to exercise an automatic tuning control over the frequency of an oscillator circuit based upon this same transistor. By employing a regenerative feedback path between the output and input circuits of the transistor sustained oscillation is obtained which may be adjusted to have a nominal frequency close to that of the desired color subcarrier value of 3.58 mc. Separated burst signal is then injected in series with the base-emitter circuit of the transistor. With a suitable time constant in series with the collector current supply path to the transistor, variations in phase between the burst signal and oscillator signal will result in significant changes in the collector voltage. These changes then cause a change in the output capacitance of the transistor in such a direction as to tune the feedback circuit and output circuit of the oscillator in a direction bringing and maintaining the phase of the developed oscillator signal in synchronous agreement with the separated burst signal.

In accordance with the present invention the feedback circuit of the above described arrangement is replaced by a tuned circuit means having a resonant frequency which is a direct function of the potential appearing across it. The series combination of an inductor and reverse biased diode (preferably of the silicon alloy junction type) may be used to achieve this result. The barrier capacitance of the diode thus biased becomes one of the determining parameters of the oscillator frequency. Variations in the collector-base potential and capacitance of the transistor resulting from frequency comparison of the generated signal with received burst is therefore caused to have a strong frequency correcting effect on the oscillator. First, the collector capacitance change retunes the feedback circuit and output circuit of the oscillator. Secondly, collector potential changes alter the reverse bias on the reverse bias feedback diode causing its barrier capacitance to change and thereby further exercise a retuning influence on the feedback circuit. Since resonant frequency of the feedback circuit primarily controls the oscillator frequency, the present invention provides remarkable oscillator stability and synchronizing sensitivity.

It is, therefore, an object of the present invention to provide an improved automatic frequency controlled oscillator circuit requiring but a single semiconductor amplifying element yet having good stability.

It is further an object of the present invention to provide a simple oscillator circuit based upon a single transistor in which a high gain automatic frequency control action may be derived including the functions of, oscillatory generation of a signal wave, a signal responsive frequency control means for the oscillatory action, and means applying to said frequency control means a signal representing the phase comparison of the generated oscillatory wave with a reference signal.

It is further an object of the present invention to provide a low cost transistor circuit for use in color television receivers for developing a continuous wave color demodulating signal with the functions of phase comparison, signal generation and phase correction being provided in a single transistor stage.

A more complete understanding of the present invention as well as a fuller appreciation of its objects and features of advantage will be derived from a reading of the following specification especially when taken in connection with the accompanying drawings in which.

Figures 1, 2:
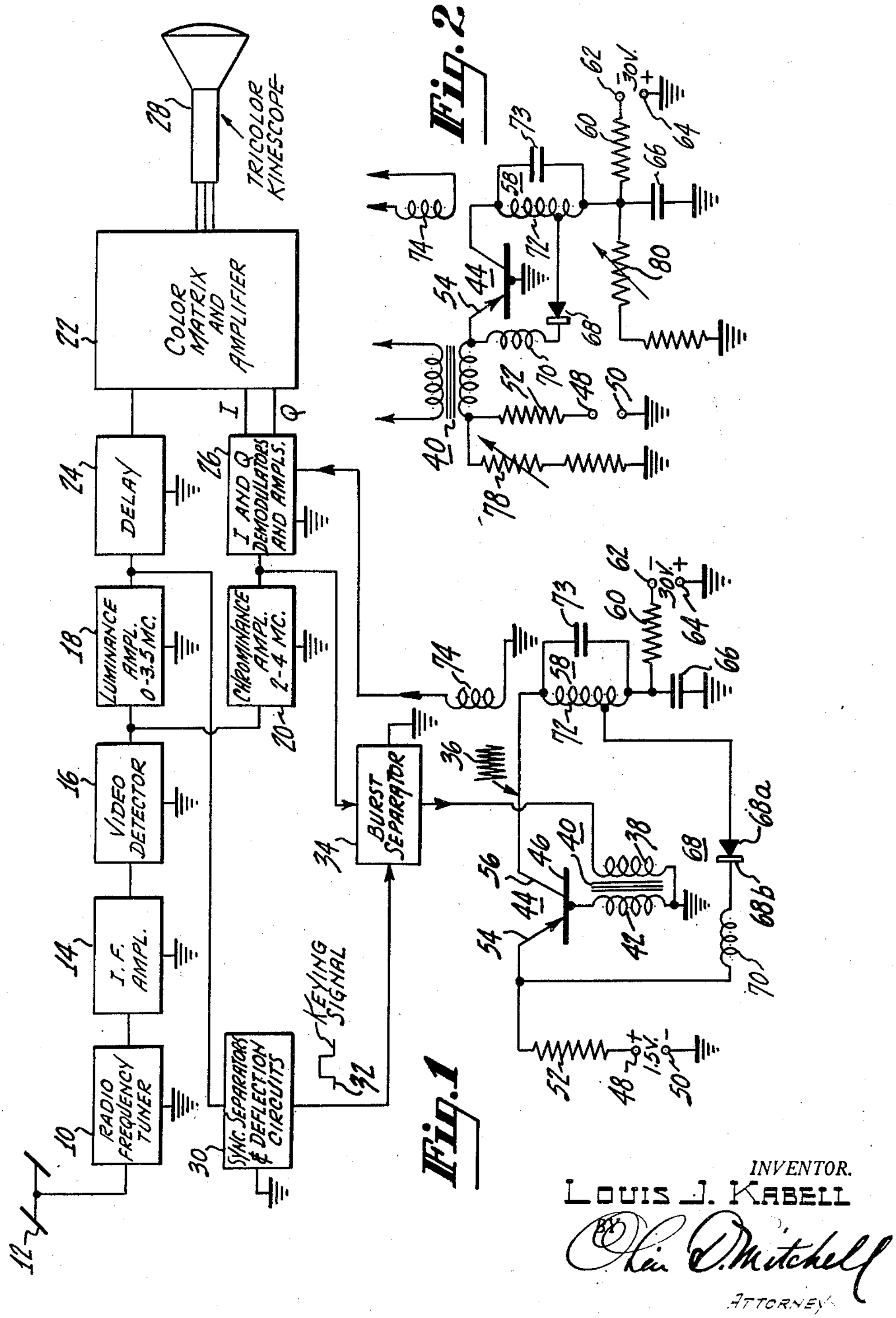
Figure 1 is a combination block and schematic representation of a color television receiver embodying the present invention.
Figure 2 is a schematic representation of another form of the present invention suitable for application in color television receivers of the type illustrated in Figure 1.

Turning now to Fig. 1 of the drawings, there appears in block form the well known and conventional elements of a color television receiving system. These block elements are depicted only for the purpose of more clearly illustrating a particular embodiment of the present invention which is illustrated schematically. The color television receiving system shown comprises a radio frequency tuner 10 receiving signals from an antenna 12. The output of the tuner 10 is applied to a conventional intermediate frequency amplifier 14 designated as an I. F. amplifier. A video detector 16 is connected with the output of the I. F. amplifier 14 and is adapted to drive the luminance and chrominance amplifiers 18 and 20 in a conventional fashion. Luminance information is conveyed from the luminance amplifier 18 to the color matrix 22 via the delay line 24. Chrominance information is applied from the chrominance amplifier 20 to the I. and Q. demodulators within the block 26. I. and Q. chromaticity informations as derived from the demodulators are also applied after possible additional amplification (not shown) to the color matrix 22. Red, green and blue direct color signal information developed by the color matrix 22 is applied to the tricolor kinescope 28 for reproduction of the color television signal.

In order that I. and Q. demodulators may properly demodulate I. and Q. information from the chrominance signal, it is known that the demodulators must be supplied with a continuous wave demodulating signal sometimes referred to as the chromaticity demodulating signal. It is general practice to establish the required frequency of this signal at 3.579545 megacycles which in systems of this type corresponds to the frequency of the standard burst component of the received color television signal. The burst component in a standard color television signal is transmitted for the purpose of acting as a reference to the receiver for establishing and maintaining synchronous demodulation of the color signal. This burst component is transmitted during the horizontal blanking interval of the television signal and is conventionally separated from the chrominance signal by means of a simple keyed gate circuit. It is convenient to derive the keying signal for burst separation from the deflection circuit of the television receiver since a modified form of a reaction scanning flyback pulse may be used as a keying signal in that it occurs during the horizontal blanking interval.

Accordingly in the drawing, luminance signal from the amplifier 18 is applied to the block 30 which includes suitable conventional forms of sync separator and deflection circuits. It is from the horizontal deflection circuit within the block 30 that the keying signal 32 is derived and applied to the burst separator circuit 34. Such an arrangement is disclosed in an article entitled "The CT–100 Commercial Color Television Receiver," pages 445–460 of the RCA Review for September 1954. As stated hereinabove, the burst separator circuit 34 may be nothing more than a keyed gate circuit which is "turned on" by the keying signal 32 during the burst component of the received color signal. Video signal containing the burst component is applied to the burst separator from the chrominance amplifier 20. During the reception of color signals a burst signal 36 will, therefore, appear as the output of the burst separator. In general, the burst comprises approximately nine cycles of a signal having the above mentioned frequency of 3.579545 megacycles or approximately 3.6 megacycles.

In accordance with the arrangement shown separated burst signal is applied to the primary winding 38 of the coupling transformer 40. The low impedance secondary winding 42 of the transformer is connected in the emitter base path of a semiconductor amplifier device such as the transistor 44. The connection constitutes means for applying a reference signal comprising separated burst component to the input circuit of the transistor. As shown in the drawing, the winding 42 is connected between the base 46 and circuit ground. Forward emitter base bias is obtained from a suitable voltage source (not shown) whose terminals are indicated at 48 and 50. Purely by way of example, a workable voltage source has been indicated at 1.5 volts. This forward bias voltage is applied through the isolating resistor 52 to the emitter 54. The collector 56 is connected through the tuned circuit 58 and through the time constant resistor 60 to a source of reverse bias potential having terminals at 62 and 64. A time constant capacitor 66 is connected from the lower extremity of the tuned circuit 58 to circuit ground. A regenerative feedback path is then provided between the tuned circuit 58 and the emitter 54.

According to the present invention, the regenerative feedback path provided between the tuned circuit 58 and the emitter 54 is voltage sensitive as to its resonant frequency and, by way of example, comprises a series connection of a diode 68 and an inductor 70. The diode 68 is preferably of the silicon junction variety, however, any type diode device or other means exhibiting a reactance, the value of which is a function of the value of potential appearing across it is suitable. With the connections of the diode shown, the anode **68*a* of the diode 68 is maintained at a negative potential with respect to the cathode 68*b*. Under these conditions, the diode 68 will be reverse biased and non-conductive to direct current flow. However, as is characteristic of silicon junction diode devices the capacitance between terminals 68*a* and 68*b* will vary as a function of the potential appearing across the diode. The effective capacitance provided by the diode 68 acting in combination with the inductor 70 provides a series tuned circuit which is voltage sensitive as to its resonant frequency and acts as a regenerative feedback path between the tuned circuit 58 and the emitter 54** whereby sustained oscillation of the circuit is produced.

In accordance with the arrangement of Fig. 1, the impedance of the secondary winding 42 of the transformer 40 is sufficiently low so that the transistor 46 operates as a sine wave oscillator at a frequency mainly determined by the resonant frequency of the regenerative feedback path comprising the diode 68 and the inductor 70. The resonant frequency of the tuned circuit 58 is secondarily determinative of the frequency of oscillator operation. The value of inductor 70 taken in combination with capacitance provided by the diode 68 when under reverse bias conditions is selected to establish a resonant frequency close to the desired 3.579545 megacycles corresponding to the frequency of the standard color subcarrier. The value of the inductor 72 taken in combination with the value of a shunt capacitor 73 and further taking into account the effective capacitance between the collector 56 and circuit ground is established to provide an output circuit also resonant at the desired 3.579545 megacycle value. As is well known, the value of reactance appearing between the collector 56 and circuit ground will be a function of the output capacitance of the transistor which, in turn, is a function of the bias appearing between the collector 56 and base 46. Should the collector-base potential of the transistor change, the value of capacitance in shunt with the inductor 72 will change and the resonant frequency of the tuned circuit 58 will be altered.

With this in mind, the value of resistor 60 and the value of capacitor 66 are chosen to form a time constant circuit whose value is more than the period of the horizontal deflection rate or the recurrence period of the burst 36. Since the burst 36 is applied in series with the base-ground path of the transistor circuit, the phase of the burst is effectively compared with the signal developed by the transistor (acting as an oscillator). A change in the phase relationship between the burst 36 and the signal produced by the transistor (again acting as an oscillator) will cause a change in the average collector current of the transistor. The collector current will be increased or decreased depending upon the direction and magnitude of the phase difference between the separated burst 36 and the oscillator signal. With a phase error corresponding to an increase in the oscillator frequency, the average collector current during the burst interval will increase. The charge on capacitor 55 will then be decreased and the effective collector-base bias potential decreased. A decrease in the collector-base bias potential acts to increase the effective capacitance appearing between the collector 56 and circuit ground and thereby lower the frequency of the tuned circuit 58 and reduce the frequency of the oscillator. A phase error in the opposite direction will, of course, decrease the collector-base potential and provide an opposite tuning effect on the output circuit. With this arrangement, the circuit as a whole operates as an oscillator which is automatically tuned by reactance changes to stay in synchronism with the arriving burst signal.

In order to increase the control sensitivity of the circuit just described, the present invention takes further advantage of the change in barrier capacitance of the diode 68 as a function of the potential appearing across the diode 68. Thus, if the oscillator frequency is too high the phase comparison action will result in a greater collector current during the burst interval. This will decrease the magnitude of reverse bias applied across the diode 68 resulting in a decrease in the resonant frequency of the feedback circuit involving the diode 68. Consequently, in accordance with the present invention a double frequency control influence on the oscillator is achieved and unusually high control sensitivity is realized.

Although the secondary winding 42 of the transformer 40 has been shown as connected with the base to ground circuit of the transistor, the reference of burst signal 36 can otherwise be applied to the input circuit without departing from the spirit and scope of the present invention. This is illustrated in Fig. 2 in which transformer 40 is shown connected between the emitter 54 and the resistor 52. The nominal frequency of operation may be manually controlled by varying the potentiometer 78 or 80 either of which permits alteration of the average collector base current of the transistor thereby changing the collector base potential and altering both the effective capacitance across tuned circuit 58 as well as the capacitance expressed by diode 68.

Although the output capacitance change in the transistor 44 may be attributable in part to changes in the effective collector-base capacitance as a function of collector-base potential, it will be understood that other factors may enter into the producing of the total output capacitance change at the collector terminal. Briefly, a semiconductor amplifier has two variable capacitance parameters. Actual collector-to-base capacitance is known to vary as a function of polarizing voltage appearing between collector and base and is attributable to changes in the effective width of the barrier zone between the collector and base elements. This barrier zone may be thought of as a dielectric, the thickness of which increases with increasing reverse bias. It is further known that the emitter-to-base capacitance of a semiconductor amplifier changes as a function of emitter-base potential due to changes in what is called the diffusion capacitance or the charge storing effect of a semiconductor amplifier. The same considerations hold in the case of the semiconductor junction type diode. Thus it is that in accordance with the present invention, potential changes appearing at the collector electrode 56 as a function of phase error produces the aforestated double tuning effect. Moreover, variations in the output capacitance of the transistor alters the frequency of both the tuned circuit 58 and the series circuit 68—70 while at the same time the potential change imposed across the diode 68 further changes the resonance frequency of the feedback circuit itself.

Having thus described my invention, what is claimed is:

1. In an automatic frequency controlled oscillator system, the combination of: a source of frequency reference signal; a semi-conductor amplifier device having electrodes respectively corresponding to a base, emitter and collector; an emitter bias source means having a first and second terminals; a collector bias source means having a first and second terminals; an impedance means connected between said emitter and said first terminal of said emitter bias source means; a connection from said second terminal of said emitter bias source means to said base electrode to define an input circuit between said emitter and base; a first resonant circuit means tuned to resonate at approximately the frequency of said reference signal when operatively connected as hereinafter defined; a connection from a first point in said resonant circuit to said collector electrode; a resistance means connected from said first terminal of said collector bias source to a second point in said resonant circuit; a capacitor connected from the resonant circuit extremity of said resistance means to the second terminal of said collector bias source means; a connection from said collector bias source means second terminal to said emitter bias source second terminal; a second resonant circuit means connected from a point in said first resonant circuit means to said emitter electrode in a manner to cause oscillation by said amplifier device; voltage responsive variable reactance means included in said second resonant circuit and so connected therein as to change the resonance of said second tuned circuit as a function of changes in the potential of said collector electrode; and means coupled with said source of frequency reference signal and said amplifier device input circuit to impose therein electrical signal variations corresponding to said reference signal.

2. In an automatic frequency controlled oscillator system, the combination of: a source of frequency reference signal; a semi-conductor amplifier device having electrodes respectively corresponding to a base, emitter and collector; an emitter bias source means having a first and second terminals; a collector bias source means having a first and second terminals; an impedance means connected between said emitter and said first terminal of said emitter bias source means; a connection from said second terminal of said emitter bias source means to said base electrode to define an input circuit between said emitter and base; a first resonant circuit means tuned to resonate at approximately the frequency of said reference signal when operatively connected as hereinafter defined; a connection from a first point in said resonant circuit to said collector electrode; a resistance means connected from said first terminal of said collector bias source to a second point in said resonant circuit; a capacitor connected from the resonant circuit extremity of said resistance means to the second terminal of said collector bias source means; a connection from said collector bias source means second terminal to said emitter bias source second terminal; a second resonant tuned circuit including an inductance in series connection with a diode to form a combination, the electrical polarity with which said diode is connected being such that said diode may be reversed biased as defined hereinafter, said diode being of a type expressing a variable capacitance as a function of the magnitude of reverse bias imposed thereon; means connecting said combination from a point in said first resonant circuit means to said emitter electrode in a manner imposing a reverse bias on said diode and causing oscillation by said amplifier device; and means coupled with said source of frequency reference signal and said amplifier device input circuit to impose therein electrical signal variations corresponding to said reference signal.

3. In a transistor oscillator circuit the combination of: a transistor having a base electrode, collector electrode and emitter electrode; galvanically conductive input circuit means connected between said emitter and said base, said input circuit means including emitter biasing means and means for introducing therein a reference timing signal; galvanically conductive output circuit means connected between said collector and said base, said output circuit means including a parallel tuned circuit, time constant means and a collector bias potential source connected in series with one another, said time constant circuit being of a value causing substantial changes in the collector-base potential as a function of changes in collector current; a diode of the type expressing a terminal capacitance which is a direct function of the value of reverse bias applied thereto; an inductor connected in series with said diode to form a series resonant circuit when said diode is reverse biased; means connecting said series resonant circuit between said output circuit means and input circuit means with a polarity imposing a reverse bias on said diode and producing oscillation of said transistor; and a source of reference timing signal of discrete frequency operatively connected with said input circuit means for introducing therein timing signal, whereby to produce collector current changes as a function of timing differences between said timing signal and oscillating frequency of said transistor, the resonant frequencies of said parallel tuned circuit and said series resonant circuit being integrally related to the discrete frequency of said timing signal.

4. In a color television receiver for receiving a color television signal requiring synchronous demodulations by a chromaticity demodulating wave of a given demodulating frequency represented by a burst component in said color television signal; a frequency controlled oscillator for producing said chromaticity demodulating wave comprising in combination; a semiconductor oscillator circuit including a semiconductor amplifier having at least an emitter collector and base electrodes, said oscillator having an input circuit connected with said emitter and an output circuit connected with said collector; a source of timing signal derived from received burst component; a diode of a type expressing a terminal capacitance directly related to the value of reverse bias applied to said diode; an inductor connected with said diode to form a tuned circuit when said diode is reversed biased; means connecting said tuned circuit in frequency determining relation to said oscillator and in a manner imposing a reverse bias on said diode, the value of reverse bias and the value of said inductor being such to resonate said tuned circuit at the value of said timing signal; means connected with said oscillator and said timing signal source producing a potential which varies in value as a function of the timing difference between said oscillator and timing signal; and means varying the value of reverse bias on said diode as a function of said varying potential with an electrical sense tending to stabilize the frequency of said oscillator.

No references cited.